March 4, 1947.  W. R. TUCKER ET AL  2,416,858
HYDRAULIC TESTING APPARATUS
Filed Jan. 20, 1944   2 Sheets-Sheet 2

INVENTORS
WARREN R. TUCKER,
BY WALTER ERNST,
Toulmin & Toulmin
ATTORNEYS

Patented Mar. 4, 1947

2,416,858

UNITED STATES PATENT OFFICE 2,416,858

HYDRAULIC TESTING APPARATUS

Warren R. Tucker, Dayton, and Walter Ernst, Mount Gilead, Ohio, assignors to H-P-M Development Corp., Wilmington, Del., a corporation of Delaware Application January 20, 1944, Serial No. 518,966

12 Claims. (Cl. 73—94)

The present invention relates to testing apparatus for determining the tensile or crushing strength of materials, and more particularly to machines of this character which are actuated by pressure fluid.

Machines of this general type must be capable of generating high forces in order to rupture or crush the article being tested and furthermore, such machines must be equipped with suitable instruments for indicating or recording the generated forces, from which data the strength of the article under test may be computed. It is obvious that the computed results of a test will be accurate only if the forces exerted on the workpiece are accurately indicated or recorded and this represents a real problem in that the position at which the pressure is applied by the pressure fluid is unusually remote from the surface which applied the resulting pressure to the article and inaccuracy in transferring the pressure from one position to the other is often present. These inaccuracies may be brought about by frictional effects between the various pistons and the cylinder so that the pressure or force which is actually applied against the article being tested does not represent an exact replica of the pressure or force which is being supplied to the actuating surface by the pressure fluid pump.

The principal object of the invention is to provide an improved hydraulic testing machine, particularly one in which friction losses are entirely eliminated or at least reduced to a minimum to the end that the pressure which is applied against the primary actuating surface is available in exactly the same amount against the actuated or secondary surface which contacts the article under test.

Another object is to provide a hydraulic ram so constructed that the frictional losses between the force generated in the main area and the force applied to the workpiece are negligible so that the latter force is sensibly the same as that applied to the main area. By accomplishing this, it is possible to measure the pressure in the main area and from that to calculate accurately the force on the workpiece.

Still another object is to provide an improved compression or tensile testing machine of the hydraulically actuated type wherein the compression or tensile strength of the test sample can be read directly on a suitable indicating gage that is calibrated in pounds per square inch, compression or tensile strength.

In carrying out these objects we rotate the ram throughout its travel at least in the testing direction and in addition, equal pressure is applied at both ends of the ram in order to eliminate or equalize any unbalance of internal forces. Thus, the ram is in effect supported on friction-free bearings which need carry only the weight of the rotating mechanism.

Accordingly, another object of the invention is to provide an improved hydraulically actuated testing machine wherein a part of the mechanism for obtaining power to apply compression or tension to the test sample is rotated in order to reduce friction, and the mechanism is balanced hydraulically while permitting the rotating effect in order to prevent axial movement of the piston due to an unbalance of forces in the cylinder.

The invention will be better understood when reference is made to the following description and the accompanying drawings in which:

Figure 4 is a schematic layout of a hydraulic system for operating the testing apparatus.

Figure 1:
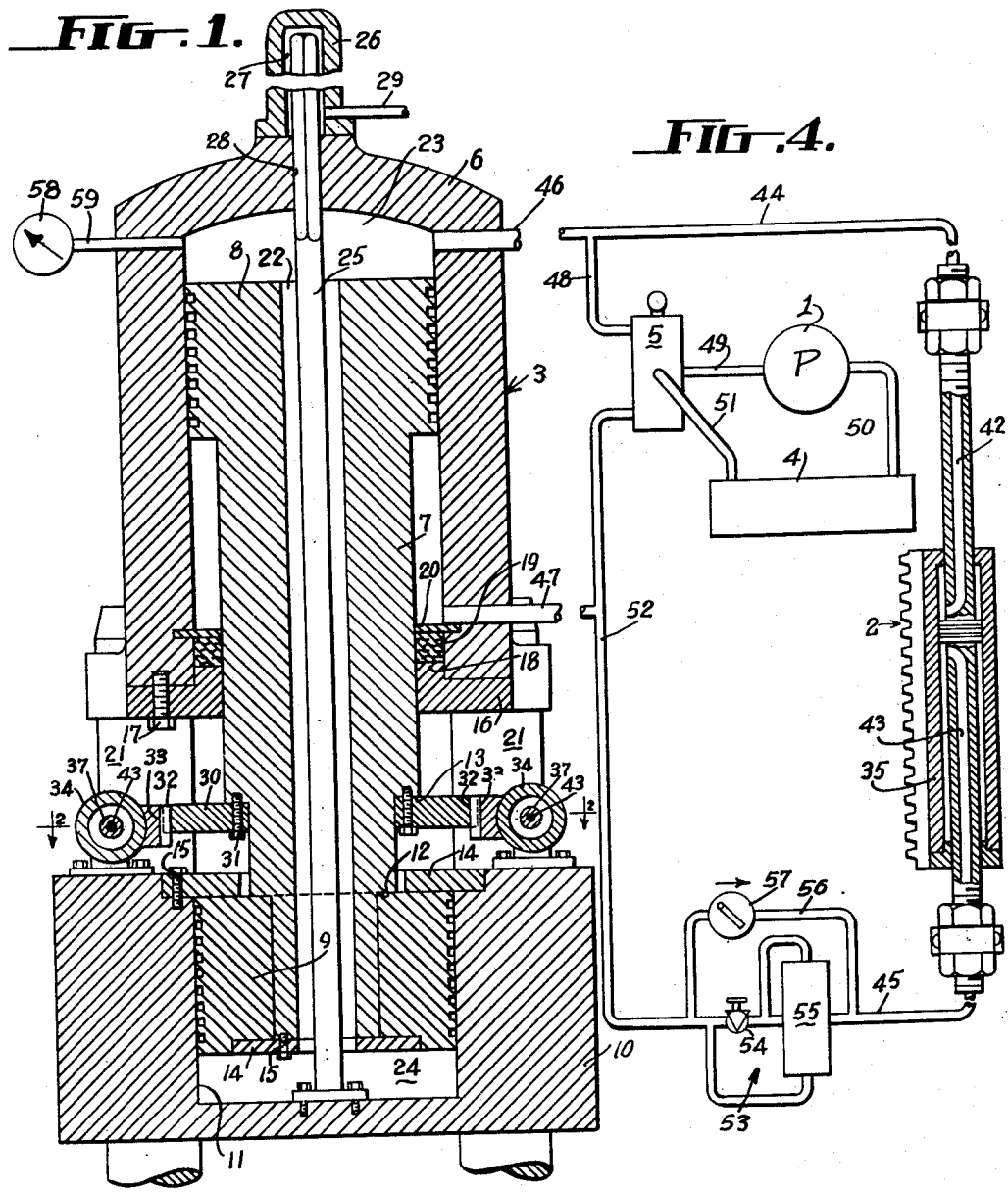
Figure 1 represents a longitudinal sectional view of the improved testing equipment.

The testing machine of this invention includes a pressure fluid pump 1 driven by a suitable electric motor, a hydraulic type of rotating mechanism indicated generally by the reference character 2 and a testing mechanism 3 hereinafter described. The pump 1 is preferably of the variable delivery type for continuously supplying fluid under pressure to the testing mechanism so that pressure will be increasingly built up in the testing mechanism gradually to apply increasing pressure to the material being tested until the sample breaks or is crushed. A body of fluid contained in a reservoir or tank 4 supplies the pump with a pressure medium, the latter being controlled by a 4-way valve 5 of any suitable and well known type.

The testing mechanism 3 includes a heavy cast iron cylinder 6 closed at the top but open at the bottom to receive a ram or plunger 7 provided at each end with a grooved piston 8, 9 respectively. The latter extends upon the open end of the cylinder and is adapted slidably to reciprocate through relatively small travel with respect to a surrounding platen 10. The latter is provided with a large counterbored opening 11 which snugly receives the lower piston 9 and has a diametral size exactly the same as the interior dimension of the cylinder 6. The ram 7 is provided with a pair of shoulders indicated respectively at 12, 13 to provide two ram portions of different diameter from the main portion of the ram. The piston 9 may abut the shoulder 12 and it is detachably held in position by a retaining plate 14, screwed as indicated at 15 to the end of the ram. This retaining plate lies flush with the lower surface of the piston 9.

The open end of the cylinder 6 is held by a cover plate 16 screwed as indicated at 17 to the end of the cylinder and has a flange portion 18 which extends into the annular recess between the plunger 7 and the interior of the cylinder. There are a plurality of layers 19 of packing material resting on the flange 18 and this material is held in position by means of a large split washer structure 20 which sets in an annular groove formed in the cylinder at a position such as to apply a compressing force on the packing material. Thus, the ram 7 is rendered fluid tight at the position of the packing element.

The platen 10 is mounted for reciprocatory movement on suitably positioned guides or guide rods 21 and the structure as a whole is carried on a bed plate or support by means of strain rods (not shown), but which in certain cases may also be constituted of the guide rods 21. The ram 7, including the oppositely disposed pistons 8, 9 is provided with a longitudinally extending, centrally positioned opening 22 which in effect serves as a pressure communicating passageway between the upper pressure area and the lower pressure area 24. There is a rod 25 bolted at the lower end to the lower surface of the counterbored opening 11 and at the other end extends through the top of the cylinder into an upstanding cap member 26 which has a large interior opening 27 adapted readily to receive the rod and to accommodate any longitudinal movements thereof with respect to the cylinder. The upper end of the rod is provided with a squared configuration starting with a position just inside the cylinder and this squared portion is snugly received by a square opening 28 in the cylinder, this opening giving a keying effect to prevent any rotation of the rod 25 with respect to the cylinder. Thus, the platen 10 is prevented from rotating and can therefore only slide up and down on its guide rods 21. Inasmuch as the opening in the cap member 26 constitutes in effect a closed chamber, a conduit 29 is provided for draining off any pressure fluid which is forced through the square opening 28.

In accordance with one of the features of the invention, the ram 7 is provided with mechanism for rotating the same during its excursions within the cylinder 6 and for this purpose a ring gear 30 is screwed as indicated at 31 or otherwise secured to the shoulder 13 on the ram. The teeth of the gear are illustrated at 32 (Figure 2) and may have a convolute or any other desired shape. Positioned at opposite sides of the circular gear 30 there is a pair of racks 33 of somewhat greater thickness than the thickness of the teeth 32 for reasons which will be explained presently, these racks being so arranged that both of them are operated simultaneously to move the gear 30 in one direction or the other depending on the manner in which pressure fluid is introduced into the actuating cylinder. The racks 33 are secured to the inner sides of a pair of reciprocatory cylinders 34 having an interior pressure chamber 35. The cylinders are mounted on and carried by a pair of stationary pistons 36, preferably having a grooved periphery. Each of these pistons is positioned approximately midway between a pair of longitudinally aligned piston rods 37 having threaded ends 38 which are received in straps 39 and secured thereto by nuts 40. The interior of the cylinders 34 is closed by a closure member 41 so that when pressure fluid is introduced on either side of the piston 36 and exhausted from the other side as will be explained hereinafter, the cylinder 34 is caused to move in the horizontal direction and to turn the gear 30 through the rack 33 and the gear teeth 32 and thus rotate the ram 7. Pressure fluid is applied to either side of each piston 36 through conduits 42, 43 which connect with pipes 44, 45 respectively of the hydraulic control system (Figure 1).

Figure 2:
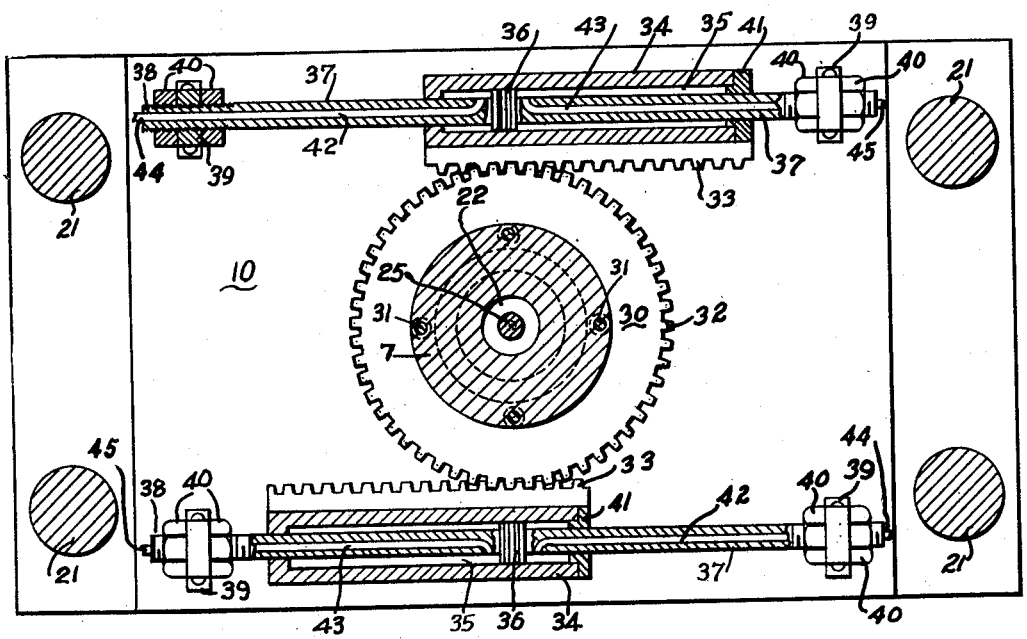
Figure 2 is a sectional view somewhat enlarged of the apparatus shown in Figure 1 and taken along line 2—2 in that figure, looking in the direction of the arrows.

As shown in Figure 2, the pressure fluid conduit 42 is located to the left of the upper piston but to the right of the lower piston so that when pressure fluid is introduced into these conduits in the manner which will be described hereinafter, the upper cylinder will be caused to move to the left and the lower cylinder will be caused to move to the right simultaneously.

Conduits 46 and 47 respectively are taken from the cylinder 6 on opposite sides of the upper piston 8 for introducing pressure fluid to either side of the piston in order to operate the platen 10. The conduits 44 and 46 are connected together and pass into one of the pressure ports of the 4-way valve 5 through a conduit 48. The pressure ram of the valve 5 is connected by a conduit 49 to the pump 1 and the low pressure side of the pump is connected through a pipe 50 to the tank 4. A pipe 51 is taken from the tank to the exhaust port of the valve 5. The conduit 47 forms a branch of the main conduit 52 and the latter is connected through a hydraulic choke system indicated generally at 53 through the conduit 45. The purpose of the choke system 53 is to provide a regulatable choking effect of the fluid being exhausted from the lower end of the cylinder 35 but at the same time will permit a full and unobstructive flow of pressure fluid into the lower end of the cylinder during a different part of the operating cycle.

In general, the choke system comprises a needle valve 54 and a main valve 55 which contains a reciprocatory valve stem (not shown) for controlling the fluid opening therethrough. The movement of the valve stem and therefore the control of the size of the opening is dependent on the pressure drop established across the needle valve 54 so that by regulating the latter valve any desired control of the fluid passing through the pipe 45 may be exercised. A variable choke valve of this general character is illustrated and described in the Farnham Patent 2,146,537 assigned to the same assignee as the present application. In order to prevent any choking effect of the pressure fluid flowing into the lower end of the cylinder a branch circuit 56 containing a one-way valve 57 is connected around the variable choke valve.

In operation, the accurately sized test piece is placed under the platen and the four-way valve 5 is operated to advance the platen. When the latter engages the work and the pressure builds up, the ram will float with equal forces exerted thereon from above and below due to the passageway 22 which connects the chambers 23 and 24 together. At this time, the piston 8 moves downward slightly in its bore and rides free of the plate 14. Thus the ring gear 30 moves slightly downward with respect to the racks 33 and for this reason the latter have a greater thickness than the ring gear as can be seen in Figure 1. The main cylinder pressure is conducted through the conduit 44 to each of the cylinders 34 so that pressure fluid in effect is introduced to the left of the upper piston 36 (Figure 2) and to the right of the lower piston, causing their respective cylinders to move to the left and right respectively. This in turn serves to rotate the ring gear 30 counter-clockwise, thus turning the ram 7 and its terminating pistons 8 and 9. The fluid which is present on the low pressure side of each of the pistons 36 is exhausted through one or more conduits 45 and through the variable choke valve 53 into the conduit 52 which also receives fluid exhausted from the lower side of the piston 8 through the conduit 47. This exhaust fluid is taken through the 4-way valve 5 back to the tank 4. The choked outlet represented by the variable choke valve 53 serves the purpose of preventing too rapid rotation of the ram 7 in order that the working stroke of the platen 10 may be completed before the cylinders 34 reach the end of their respective strokes and the rotation of the ram ceases.

On the retraction stroke, push back pressure fluid is admitted to the lower side of the piston 8 through the conduit 47 by reversing the 4-way valve 5 and this fluid is also admitted to the right hand side of the upper piston 36 (Figure 2) and the left hand side of the lower piston through the by-pass valve 57 and through the conduits 37 so that the upper and lower cylinders (Figure 2) are caused to move to the right and left respectively in order to rotate the ring gear 30 clockwise. Inasmuch as there is no particular need on the up stroke of the pistons 8, 9 to make sure that the rotary action of the ram 7 carries all the way from the lower limit of travel of the ram to the upper limit, it is not necessary to provide a variable choke valve in the conduit 56. As was explained hereinbefore, it is only on the down stroke of the ram that the variable choke valve structure 53 becomes really necessary as it is during this part of the operation that the test is taking place.

During the clockwise movement of the ram the latter is forced upwardly by the pressure fluid acting on the lower surface of the piston 8 and the exhaust fluid from the compartment 23 goes through the conduits 46, 48 through the valve 5, conduit 51 to the tank. The retraction sides of the pistons 36 of the cylinders 34 are also exhausted through the conduit or conduits 44 and the valve 5 to the tank. As the ram 7 moves upwardly, the lower piston 9 picks up the platen 10 by means of the plate 14 and carries it upwardly with the ram.

By rotating the ram during the working stroke nearly all of the friction between the pistons 8, 9 and the interior wall of the cylinder 6 is eliminated. Consequently, a pressure gage in communication through a conduit 59 with the upper pressure chamber 23 will represent a true indication of the force exerted on the workpiece which is positioned immediately below the platen 10. In fact, the gage 58 may be calibrated directly in pounds of force rather than pressure. It will be noted that the ram and its two oppositely disposed pistons 8, 9 in effect float within the cylinder 6 due to the admission of the same pressure in each of the chambers 23 and 24. It has been pointed out that the pressure areas in these chambers are exactly equal so that the integral forces acting on the respective pistons are completely balanced and there is no tendency for any axial movement of one or both of the pistons with respect to the cylinder due to any unbalance of forces within the cylinder. The force which acts against the platen 10 within the compartment 24 is exactly the same as the force which acts against the upper surface of the piston 8, which in turn is accurately measurable by the gage 58.

Figure 3:
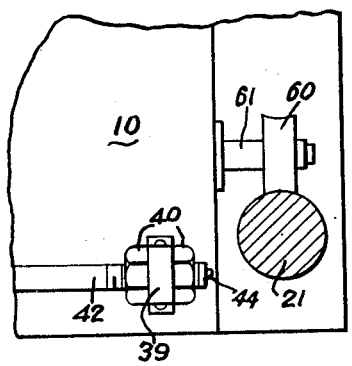
Figure 3 is a fragmentary detailed view of a modified form of accessory that may be employed in the machine shown in Figures 1 and 2.

The square topped rod 25 obviously serves to prevent any rotational movement of the platen 10, thus again assuring that all of the forces indicated by the instrument 58 operate solely in the longitudinal direction and these indications represent the actual downward force being exerted by the platen 10 on the test sample. Other ways may be employed to prevent rotation of the platen 10 and in Figure 3 there is shown a roller 60 with an arcuate peripheral surface mounted on a stud 61 which is secured to the platen. The roller may bear against a guide rod 21 and if desired as many rollers may be provided as there are guide rods. Thus, the rollers permit the platen to move upwardly or downwardly along the guide rods and at the same time provide sufficient contact with the guide rods as to prevent any rotational movement between the platen and the cylinder 6, thus again insuring that none of the energy which serves to move the ram 7 downwardly or to rotate the ram is dissipated by a rotational movement of the platen.

From the foregoing it is evident that we have disclosed an improved form of a testing machine of the hydraulically operated type in which the forces acting on the platen through a double piston form of ram may be accurately measured by an indicator. This ram is of the floating type and we have provided structure by which the ram can be simultaneously rotated throughout the entire testing operation, thus assuring the complete elimination of friction and therefore a strict accord between the measurable force acting on the ram and the actual force exerted by the platen on the test piece.

It will be understood that we desire to comprehend within our invention such modifications as come within the scope of the claims and the invention.

Having thus fully described our invention, what we claim as new and desire to secure by Letters Patent is:

1. A hydraulic press comprising a first stationary cylinder and a second movable cylinder, bores of equal diameter in said cylinders, a plunger having equal opposite end areas disposed within said bores, an unrestricted fluid communication between said areas, means for preventing relative rotation of said cylinders while permitting free relative axial movement thereof, hydraulic motor means arranged to rotate said plunger and cylinders relatively, a fluid source, a valve movable to connect said source with said areas and also with said motor for simultaneously urging said cylinders to move relatively axially and to move said plunger and cylinders to rotate relatively, and flow controlling means operable automatically for maintaining the speed of said motor means and, therefore, the rate of said relative rotation at a predetermined value.

2. A hydraulic press comprising a first stationary cylinder and a second movable cylinder, the latter acting as a platen for exerting force on a workpiece, said cylinders having bores of equal diameter therein, a plunger having equal opposite end areas disposed within said bores, said areas being interconnected by an unrestricted passage in said plunger, a gear connected with said plunger, a rack meshing with said gear, a hydraulic motor connected to actuate said rack for rotating said plunger relatively to said cylinders, a retracting area on said plunger in one of said cylinders, a source of fluid under pressure, a valve movable simultaneously to connect said source with one of said end areas and with one end of said hydraulic motor or to connect said source with said retracting area and with the other end of said motor, and means for controlling the rate of fluid supply to the said one end of said motor and for permitting the free supply of fluid to the said other end thereof.

3. In a hydraulic press, a cylinder, a plunger having a main advancing area and a retracting area reciprocable in said cylinder, a platen, a bore in said platen, a piston on the end of said plunger for being received in said bore and having an area substantially equal to the main area of said plunger, means affording unrestricted fluid communication between said main area and the bore in said platen, means for preventing relative rotation of said platen and cylinder while permitting free relative axial movement thereof, hydraulic motor means arranged to rotate said plunger relative to said cylinder and platen, a source of fluid under pressure, a valve movable to connect said source with said main area and with one end of said motor means or to connect said source with said retracting area and with the other end of said motor means, and valve means serially connected with said motor means operable to control the supply of fluid thereto when said source is connected with said main area and to permit the free supply of fluid thereto when said source is connected with said retracting area.

4. A hydraulic press comprising a movable platen for applying pressure to materials and having a cylinder bore therein, a stationary cylinder having a cylinder bore of equal diameter to that in said platen, a plunger having a pair of opposed pistons of equal surface areas, one of said pistons extending into said cylinder to form work producing and retraction chambers therewith and the other of said pistons extending into the bore in said platen to form a work producing chamber therewith, a passageway extending through said plunger and continuously and unrestricted interconnecting said work producing chambers, means for rotating said plunger with respect to each of said cylinder and platen when pressure fluid is introduced into any one of said chambers for eliminating friction between the pistons and said cylinder and platen, and means for alternately introducing fluid under pressure into said work producing chambers and said retraction chamber.

5. A hydraulic press comprising a stationary cylinder and a movable platen having cylinder bores of equal diameter therein, a plunger extending between said bores and having a pair of opposed pistons of equal size thereon which form with the bore in said cylinder working and retraction chambers and with the bore in said platen a working chamber, an unrestricted passageway extending between said working chambers for maintaining the pressure therein equal at all times, and means for alternately introducing fluid under pressure into said working chambers and the retraction chamber.

6. A hydraulic press comprising a cylinder and a hollow platen, a plunger extending between the interior area of said cylinder and platen and having a pair of opposed pistons of equal size thereon which form with said cylinder working and retraction chambers and with said platen a working chamber, passage means extending between said working chambers for continuously maintaining said plunger in a state of balance due to equal pressures being applied to said pistons at the opposite ends thereof, means for alternately introducing fluid under pressure to said working chambers and said retraction chamber, and means for rotating said plunger relative to each of said cylinder and platen when fluid under pressure is introduced into said working chambers in order to eliminate friction between the pistons and each of said cylinder and platen.

7. A hydraulic press comprising a cylinder and a hollow platen, a plunger extending between the interior areas of said cylinder and platen and having a pair of opposed pistons of equal area which form with said cylinder working and retraction chambers and with said platen a working chamber, a passageway continuously interconnecting the working chambers whereby fluid pressures therein are always equal and said plunger is always in the state of balance with respect to the said pressures, means for alternately introducing fluid under pressure to said working chambers and said retraction chamber, and means for rotating said plunger with respect to each of said cylinder and platen when fluid under pressure is introduced into said working chambers to eliminate friction between said pistons and said cylinder in platen, the said means comprising a gear and a rack structure associated with said plunger and a hydraulic motor for operating said structure in unison with the operation of said plunger.

8. A hydraulic press comprising a cylinder and a hollow platen, a plunger extending between the interior areas of the cylinder and platen and having a pair of opposed pistons of equal size on the opposite ends thereof one of which forms with said cylinder working and retraction chambers and the other of which forms with said platen a working chamber, a passageway continuously connecting said working chambers for maintaining the pressures therein equal at all times, means for rotating a plunger with respect to each of said cylinder and platen when pressure fluid is introduced into said working chambers to eliminate friction between said pistons and said cylinder and platen, said means comprising a gear secured to said plunger, a rack meshing with said gear, a hydraulic motor connected to actuate said rack, and a valve movable for applying pressure fluid to said working chambers simultaneously with the application of pressure fluid to said motor, or for applying pressure fluid to said retraction chamber.

9. A testing mechanism for determining the strength of materials comprising an actuating cylinder and an actuated platen each having a bore therein, a plunger having equal end areas extending between said bores; a valve movable for applying pressure fluid simultaneously to said end areas of said plunger in order to move said platen with respect to said cylinder and also to maintain the plunger in a state of axial pressure balance, means responsive to the supply of pressure fluid to said end areas for rotating said plunger with respect to each of said cylinder and platen, and means connecting said platen and cylinder and preventing relative rotation thereof while permitting free relative movement thereof axially.

10. A hydraulic press comprising a platen and a cylinder which are movable axially with respect to one another but are prevented from moving rotatably with respect to one another, a plunger having a pair of opposed pistons, one of said pistons extending into said cylinder to form working and pull back chambers and the other piston extending into a cylinder bore in the platen to form a working chamber, said working chambers being in continuous and unrestricted communication with one another, means for rotating said plunger with respect to each of the cylinder and platen comprising a gear connected with said plunger, a reciprocating hydraulic motor, a rack actuated by said motor and engaging said gear, a valve movable into a first position to supply fluid to one end of said motor and to said working chamber and into a second position to supply fluid to the other end of said motor and to said pull back chamber, and means of controlling the rate of movement of said motor during at least the supply of fluid to said working chamber.

11. A hydraulic press comprising first and second cylinders having bores of equal diameter therein and movable relatively axially, a plunger having equal opposite end areas disposed within said bores and having a retracting area in one of said bores, hydraulic motor means arranged to rotate said plunger and cylinder relatively, means for simultaneously supplying equal fluid pressures to said end areas for urging said cylinders to move relatively axially and for supplying a controlled quantity of pressure fluid to said motor means for relatively rotating said plunger and cylinders at a controlled rate, and means of supplying pressure fluid to said retracting area for returning said cylinders to their initial relative position.

12. A hydraulic press comprising, a stationary cylinder, a movable cylinder for acting as a platen, said cylinders having equal bores therein, a plunger having equal opposite end areas disposed within said bores and having a retracting area in one of said bores, hydraulic motor means arranged to rotate said plunger and cylinder relatively, means for simultaneously supplying equal fluid pressures to said end areas for urging said cylinders to move relatively axially and to said motor means for relatively rotating said plunger and cylinders, or to said retracting area and to said motor means to return said cylinders and plunger, and means operable during the first mentioned supply of pressure to said cylinders for controlling the rate of movement of said motor means.

WARREN R. TUCKER.
WALTER ERNST.

REFERENCES CITED

The following references are of record in the file of this patent:

UNITED STATES PATENTS

| Number | Name | Date |
|---|---|---|
| 1,411,991 | Doran | Apr. 4, 1922 |
| 2,075,968 | Von Heydekampf | Apr. 6, 1937 |
| 2,329,035 | Cross | Sept. 7, 1943 |
| 2,338,537 | Podesta | Jan. 4, 1944 |

FOREIGN PATENTS

| Number | Country | Date |
|---|---|---|
| 571,545 | German | Mar. 2, 1933 |
| 204,815 | British | Oct. 11, 1923 |
| 313,421 | German | July 10, 1919 |